(12) United States Patent
Ikeda (10) Patent No.: US 9,447,768 B2
(45) Date of Patent: Sep. 20, 2016

(54) INTERNAL COMBUSTION ENGINE (75) Inventor: Yuji Ikeda, Kobe (JP)

(73) Assignee: IMAGINEERING, INC., Kobe-shi (JP)

( * ) Notice: Subject to any disclaimer, the term of this patent is extended or adjusted under 35 U.S.C. 154(b) by 252 days.

(21) Appl. No.: 14/238,084

(22) PCT Filed: Jul. 30, 2012

(86) PCT No.: PCT/JP2012/069373
§ 371 (c)(1),
(2), (4) Date: Apr. 4, 2014

(87) PCT Pub. No.: WO2013/021852
PCT Pub. Date: Feb. 14, 2013

(65) Prior Publication Data
US 2014/0202412 A1 Jul. 24, 2014

(30) Foreign Application Priority Data

Aug. 10, 2011 (JP) .................... 2011-175446

(51) Int. Cl.
F02B 19/00 (2006.01)
F02P 23/00 (2006.01)
(Continued)

(52) U.S. Cl.
CPC .............. *F02P 23/045* (2013.01); *F02B 23/08* (2013.01); *F02P 3/01* (2013.01); *F02P 23/04* (2013.01); *H05H 1/52* (2013.01); *Y02T 10/125* (2013.01)

(58) Field of Classification Search
CPC .......... F02P 23/045; F02P 23/04; F02P 3/01; F02B 23/08; H05H 1/52; Y02T 10/125

USPC .... 123/536–539, 143 R, 143 B, 169 EL, 144
See application file for complete search history.

(56) References Cited

U.S. PATENT DOCUMENTS 4,774,914 A * 10/1988 Ward .................... F02P 23/045
123/162
4,841,925 A * 6/1989 Ward ..................... H01T 13/50
123/143 B (Continued)

FOREIGN PATENT DOCUMENTS

EP 2264308 A1 12/2010
JP 5-33755 A 2/1993

(Continued)

Primary Examiner — Joseph Dallo
(74) Attorney, Agent, or Firm — Westerman, Hattori, Daniels & Adrian, LLP (57) ABSTRACT The present invention aims at effectively improving a propagation speed of a flame utilizing an electromagnetic wave in an internal combustion engine that promotes combustion of an air fuel mixture utilizing the electromagnetic wave. The present invention is directed to an internal combustion engine including: an internal combustion engine main body formed with a combustion chamber; and an ignition device that ignites the air fuel mixture in the combustion chamber, wherein combustion cycles, in which the ignition device ignites and combusts the air fuel mixture, are repeated. The internal combustion engine further includes: an electromagnetic wave emission device that emits an electromagnetic wave to the combustion chamber from the emission antenna; a flame propagation estimation part that performs an estimation operation of estimating a propagation condition of a flame while the flame is propagating in the combustion chamber; and a control unit that controls the electromagnetic wave emission device based on an estimation result of the estimation operation.

5 Claims, 8 Drawing Sheets (51) Int. Cl.
  *F02P 23/04* (2006.01)
  *F02P 3/01* (2006.01)
  *H05H 1/52* (2006.01)
  *F02B 23/08* (2006.01)

(56) References Cited

U.S. PATENT DOCUMENTS

| | | | | |
|---|---|---|---|---|
| 4,996,967 | A * | 3/1991 | Rosswurm | F02P 9/007 123/598 |
| 2002/0059907 | A1 * | 5/2002 | Thomas | F01B 3/04 123/43 AA |
| 2006/0232214 | A1 * | 10/2006 | Seeley | H05H 1/46 315/111.21 |
| 2009/0229581 | A1 * | 9/2009 | Ikeda | B01D 53/32 123/536 |
| 2010/0192909 | A1 * | 8/2010 | Ikeda | F02D 41/402 123/436 |
| 2011/0025210 | A1 * | 2/2011 | Ikeda | F02B 23/08 315/111.21 |
| 2012/0097140 | A1 * | 4/2012 | Kusunoki | F02P 9/002 123/620 |
| 2014/0014053 | A1 * | 1/2014 | Kaneko | F02P 9/007 123/143 B |

FOREIGN PATENT DOCUMENTS

| | | |
|---|---|---|
| JP | 2007-285280 A | 11/2007 |
| WO | 02/36949 A1 | 5/2002 |
| WO | 2009/008521 A1 | 1/2009 |

* cited by examiner

INTERNAL COMBUSTION ENGINE

TECHNICAL FIELD

The present invention relates to an internal combustion engine that promotes combustion of an air-fuel mixture utilizing an electromagnetic wave.

BACKGROUND ART

Conventionally, there is known an internal combustion engine that promotes combustion of an air fuel mixture utilizing an electromagnetic wave. For example, Patent Document 1 discloses an internal combustion engine of this kind.

The internal combustion engine disclosed in Patent Document 1 includes an ignition device that causes a plasma discharge to occur by emitting a microwave in a combustion chamber before or after ignition of an air fuel mixture. The ignition device generates local plasma by discharge at an ignition plug so that the plasma is generated in a high pressure field, thereby growing the plasma by the microwave. The local plasma is generated at a discharge gap between a tip end part of an anode terminal and a ground terminal part.

PRIOR ART DOCUMENTS

Patent Documents

Patent Document 1: Japanese Unexamined Patent Application, Publication No. 2007-113570

THE DISCLOSURE OF THE INVENTION

Problems to be Solved by the Invention

A conventional internal combustion engine is configured such that an electromagnetic wave emission device emits an electromagnetic wave to a combustion chamber after the air fuel mixture is ignited, thereby improving a propagation speed of a flame. However, it has not been considered what can serve as a basis for controlling the electromagnetic wave emission device in order to effectively improve the propagation speed of the flame.

The present invention has been made in view of the above described circumstances, and it is an object of the present invention to effectively improve a propagation speed of a flame utilizing the electromagnetic wave in an internal combustion engine that promotes combustion of an air fuel mixture utilizing an electromagnetic wave.

Means for Solving the Problems

In accordance with a first aspect of the present invention, there is provided an internal combustion engine including: an internal combustion engine main body formed with a combustion chamber; and an ignition device that ignites an air fuel mixture in the combustion chamber, combustion cycles, in which the ignition device ignites and combusts the air fuel mixture, are repeated. The internal combustion engine further includes: an electromagnetic wave emission device that emits an electromagnetic wave to the combustion chamber from an emission antenna; a flame propagation estimation unit that performs an estimation operation of estimating a propagation condition of a flame during a flame propagation in the combustion chamber; and a control unit that controls the electromagnetic wave emission device based on an estimation result of the estimation operation.

According to the first aspect of the present invention, the estimation operation of estimating the propagation condition of the flame is performed while the flame is propagating in the combustion chamber. Then, the electromagnetic wave emission device is controlled based on the estimation result of the estimation operation. According to the first aspect of the present invention, the electromagnetic wave emission device is controlled in view of the propagation condition of the flame that has been estimated during the flame propagation.

In accordance with a second aspect of the present invention, in addition to the first aspect of the present invention, while the flame is propagating during one combustion cycle, the control unit controls and causes the electromagnetic wave emission device to emit the electromagnetic wave to the combustion chamber based on the estimation result of the estimation operation that has been performed in the same combustion cycle.

According to the second aspect of the present invention, while the flame is propagating during one combustion cycle, the estimation operation is performed, and then, the electromagnetic wave emission device emits the electromagnetic wave to the combustion chamber based on the estimation result of the estimation operation. According to the second aspect of the present invention, the estimation result of the estimation operation is utilized for improvement of the propagation speed of the flame in the combustion cycle in which the estimation operation has been performed.

In accordance with a third aspect of the present invention, in addition to the first or the second aspect of the present invention, the control unit controls the electromagnetic wave emission device to emit the electromagnetic wave to the combustion chamber from the emission antenna at the time of the estimation operation. The flame propagation estimation unit performs an operation, as the estimation operation, of estimating the propagation condition of the flame in the combustion chamber based on a status of the electromagnetic wave reflected from the emission antenna.

According to the third aspect of the present invention, the propagation condition of the flame in the combustion chamber is estimated based on the status of the electromagnetic wave (hereinafter, referred to as a "reflected wave") reflected from the emission antenna. The status (such as an intensity) of the reflected wave from the emission antenna changes when the flame passes through the arranged location of the emission antenna while the electromagnetic wave is being emitted from the emission antenna. Based on the status of the reflected wave from the emission antenna, it is possible to determine whether or not the flame has passed through the arranged location of the emission antenna. According to the third aspect of the present invention, view of the above described idea, the propagation condition of the flame in the combustion chamber is estimated based on the status of the reflected wave from the emission antenna.

In accordance with a fourth aspect of the present invention, in addition to the third aspect of the present invention, the electromagnetic wave emission device includes a plurality of the emission antennae for each combustion chamber. The plurality of the emission antennae are arranged in the combustion chamber in respective directions different from one another in relation to an ignition location where the ignition device ignites the air fuel mixture. The control unit controls the electromagnetic wave emission device to emit the electromagnetic wave in the combustion chamber from the plurality of the emission antennae at the time of the estimation operation. The flame propagation estimation unit performs an operation, as the estimation operation, of estimating the propagation condition of the flame in the combustion chamber based on the status of the electromagnetic wave reflected from each of the plurality of the emission antennae.

According to the fourth aspect of the present invention, there are provided the plurality of the emission antennae each adapted to emit the electromagnetic wave in order to determine whether or not the flame has passed through the arranged location thereof. The plurality of the emission antennae are arranged in respective directions different from one another in relation to the ignition location where the ignition device ignites the air fuel mixture. According to the fourth aspect of the present invention, it is possible to two-dimensionally recognize the propagation condition of the flame in the combustion chamber.

In accordance with a fifth aspect of the present invention, in addition to the second aspect of the present invention, the electromagnetic wave emission device includes a plurality of the emission antennae for each combustion chamber. The plurality of the emission antennae are arranged in the combustion chamber in respective directions different from one another in relation to an ignition location where the ignition device ignites the air fuel mixture. The control unit controls, based on the estimation result of the estimation operation, the electromagnetic wave emission device to emit the electromagnetic wave from an emission antenna that is arranged in a region which the flame passes through at a relatively lagged timing in the combustion chamber.

According to the fifth aspect of the present invention, the electromagnetic wave emission device is controlled based on the estimation result of the estimation operation so that the electromagnetic wave is emitted from an emission antenna that is arranged in the region which the flame passes through at a relatively lagged timing in the combustion chamber. From among the plurality of the emission antennae, the electromagnetic wave is emitted from an emission antenna arranged in a region having high necessity to improve the propagation speed of the flame.

In accordance with a sixth aspect of the present invention, in addition to the second aspect of the present invention, the electromagnetic wave emission device includes a plurality of the emission antennae for each combustion chamber. The plurality of the emission antennae are arranged in the combustion chamber in respective directions different from one another in relation to an ignition location where the ignition device ignites the air fuel mixture. The flame propagation estimation unit performs an operation, as the estimation operation, of estimating a timing at which the flame passes through the arranged location of each emission antenna based on the status of the electromagnetic wave reflected by the emission antenna. The control unit determines, based on the estimation result of the estimation operation, a timing of emitting the microwave from an emission antenna is determined, wherein the emission antenna is arranged at an arranged location which the flame has not yet passed through, and is different from other emission antennae arranged at arranged locations which the flame is estimated to have passed through.

According to the sixth aspect of the present invention, the timing at which the electromagnetic wave is to be emitted from an emission antenna arranged at an arranged location which the flame has not yet passed through is determined based on the timings at which the flame has passed through the arranged locations of the other emission antennae.

Effect of the Invention

According to the present invention, the electromagnetic wave emission device is controlled in view of the propagation condition of the flame that has been estimated during the flame propagation. In the combustion chamber, the distance between the flame and a wall surface of the combustion chamber is different depending on a propagation direction of the flame viewed from the ignition location of the air fuel mixture by the ignition device. This means that the flame does not propagate uniformly depending on the propagation directions of the flame. For example, in a case in which a tumble flow drifts aflame kernel from the ignition location, the flame moves toward the vicinity of the wall surface of the combustion chamber on a side toward which the flame kernel is drifted. In this case, there is a concern that a larger amount of unburned gas is produced on a side opposite to the side toward which the flame kernel is drifted. Thus, a region having high necessity to improve the propagation speed of the flame can be determined according to the propagation condition of the flame. According to the present invention, it is possible to control the electromagnetic wave emission device in view of the region having high necessity to improve the propagation speed of the flame. Accordingly, it is possible to effectively improve the propagation speed of the flame utilizing the electromagnetic wave.

Furthermore, according to the third aspect of the present invention, the propagation condition of the flame in the combustion chamber is estimated based on the status of the reflected wave from the emission antenna. The propagation condition of the flame is estimated utilizing the electromagnetic emission device that has been designed to improve the propagation speed of the flame. Accordingly, it is possible to prevent the configuration of the internal combustion engine from being complicated for the sake of estimating the propagation condition of the flame in the combustion chamber.

Furthermore, according to the fifth aspect of the present invention, from among the plurality of the emission antennae, the electromagnetic wave is emitted from the emission antenna arranged in the region having high necessity to improve the propagation speed of the flame. Accordingly, since it is possible to concentrate energy of the electromagnetic wave on the region having high necessity to improve the propagation speed of the flame, it is possible to effectively improve the propagation speed of the flame utilizing the electromagnetic wave, and thus, to improve fuel efficiency of the internal combustion engine.

BEST MODE FOR CARRYING OUT THE INVENTION

In the following, a detailed description will be given of embodiments of the present invention with reference to drawings. It should be noted that the following embodiments are merely preferable examples, and do not limit the scope of the present invention, applied field thereof, or application thereof.

The present embodiment is directed to an internal combustion engine 10 according to the present invention. The internal combustion engine 10 is a reciprocating type internal combustion engine in which pistons 23 reciprocate. The internal combustion engine 10 includes an internal combustion engine main body 11, an ignition device 12, an electromagnetic wave emission device 13, and a control device 35. In the internal combustion engine 10, a combustion cycle is repeatedly carried out in which an air fuel mixture is ignited and combusted by the ignition device 12.

<Internal Combustion Engine Main Body>

Figure 1:
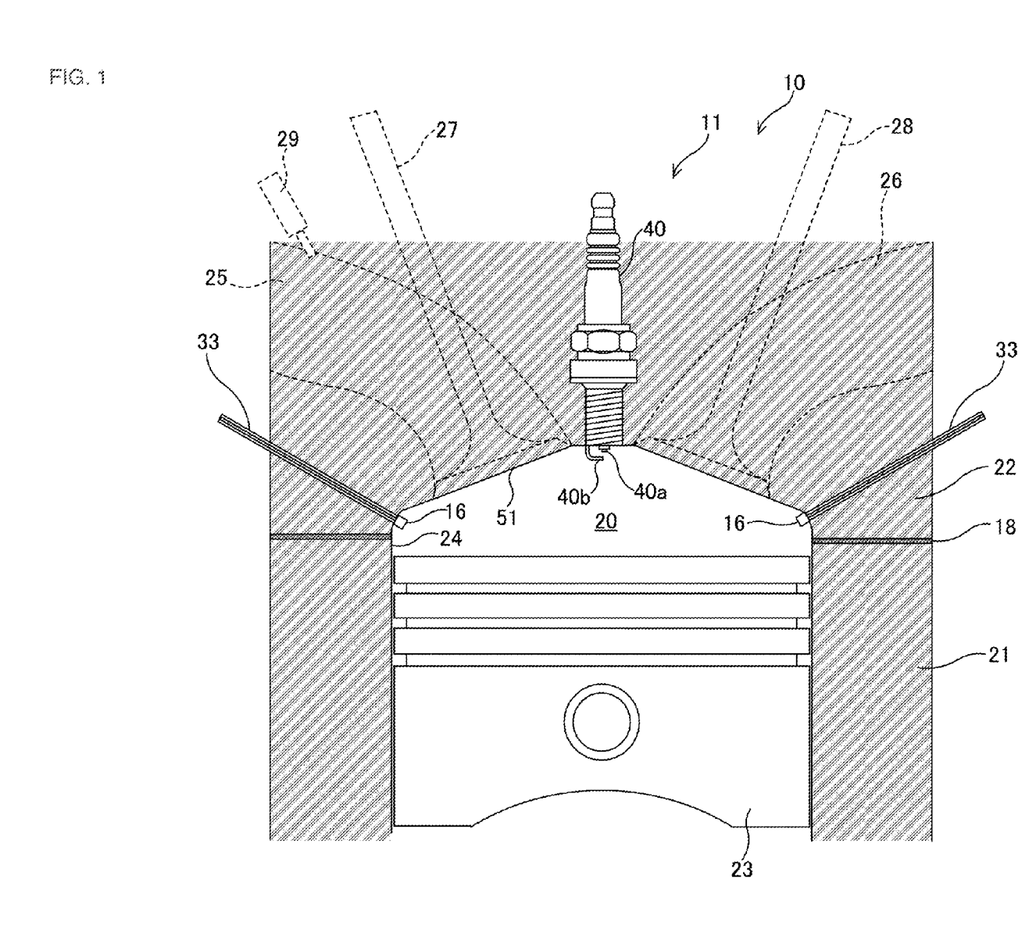
FIG. 1 is a vertical cross sectional view of an internal combustion engine according to an embodiment.

As shown in FIG. 1, the internal combustion engine main body 11 includes a cylinder block 21, a cylinder head 22, and the pistons 23. The cylinder block 21 is formed with a plurality of cylinders 24 each having a circular cross section. Inside of each cylinder 24, the piston 23 is reciprocatably mounted. The piston 23 is connected to a crankshaft (not shown) via a connecting rod (not shown). The crankshaft is rotatably supported by the cylinder block 21. While the piston 23 reciprocates in each cylinder 24 in an axial direction of the cylinder 24, the connecting rod converts the reciprocal movement of the piston 23 to rotational movement of the crankshaft.

The cylinder head 22 is placed on the cylinder block 21, and a gasket 18 intervenes between the cylinder block 21 and the cylinder head 22. The cylinder head 22 constitutes a partitioning member that partitions a combustion chamber 20 having a circular cross section, along with the cylinder 24, the piston 23, and the gasket 18. A diameter of the combustion chamber 20 is approximately equal to a half wavelength of the microwave emitted to the combustion chamber 20 by the electromagnetic wave emission device 13.

Figure 2:
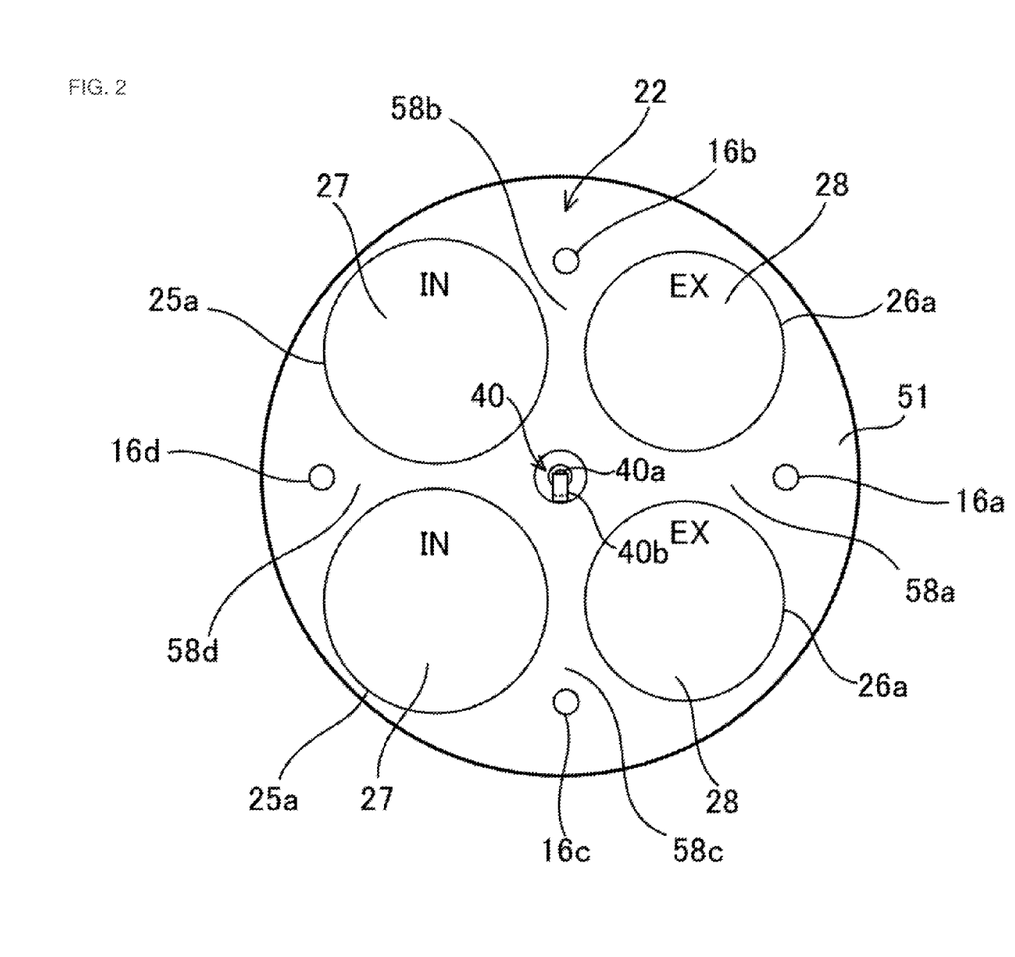
FIG. 2 is a front view of a ceiling surface of a combustion chamber of the internal combustion engine according to the embodiment.

The cylinder head 22 is provided with one ignition plug 40 that constitutes a part of the ignition device 12 for each cylinder 24. As shown in FIG. 2, the ignition plug 40 locates at a central part of a ceiling surface 51 of the combustion chamber 20. The ceiling surface 51 is a surface of the cylinder head 22 and exposed toward the combustion chamber 20. An outer periphery of a tip end part of the ignition plug 40 is circular viewed from an axial direction of the ignition plug 40. The ignition plug 40 is provided with a central electrode 40a and a ground electrode 40b at the tip end part of the ignition plug 40. A discharge gap is formed between a tip end of the central electrode 40a and a tip end of the ground electrode 40b.

The cylinder head 22 is formed with intake ports 25 and exhaust ports 26 for each cylinder 24. Each intake port 25 is provided with an intake valve 27 for opening and closing an intake side opening 25a of the intake port 25, and an injector 29 for injecting fuel. On the other hand, each exhaust port 26 is provided with an exhaust valve 28 for opening and closing an exhaust side opening 26a of the exhaust port 26. The internal combustion engine 10 is designed such that the intake ports 25 form a strong tumble flow in the combustion chamber 20.

<Ignition Device>

Figure 3:
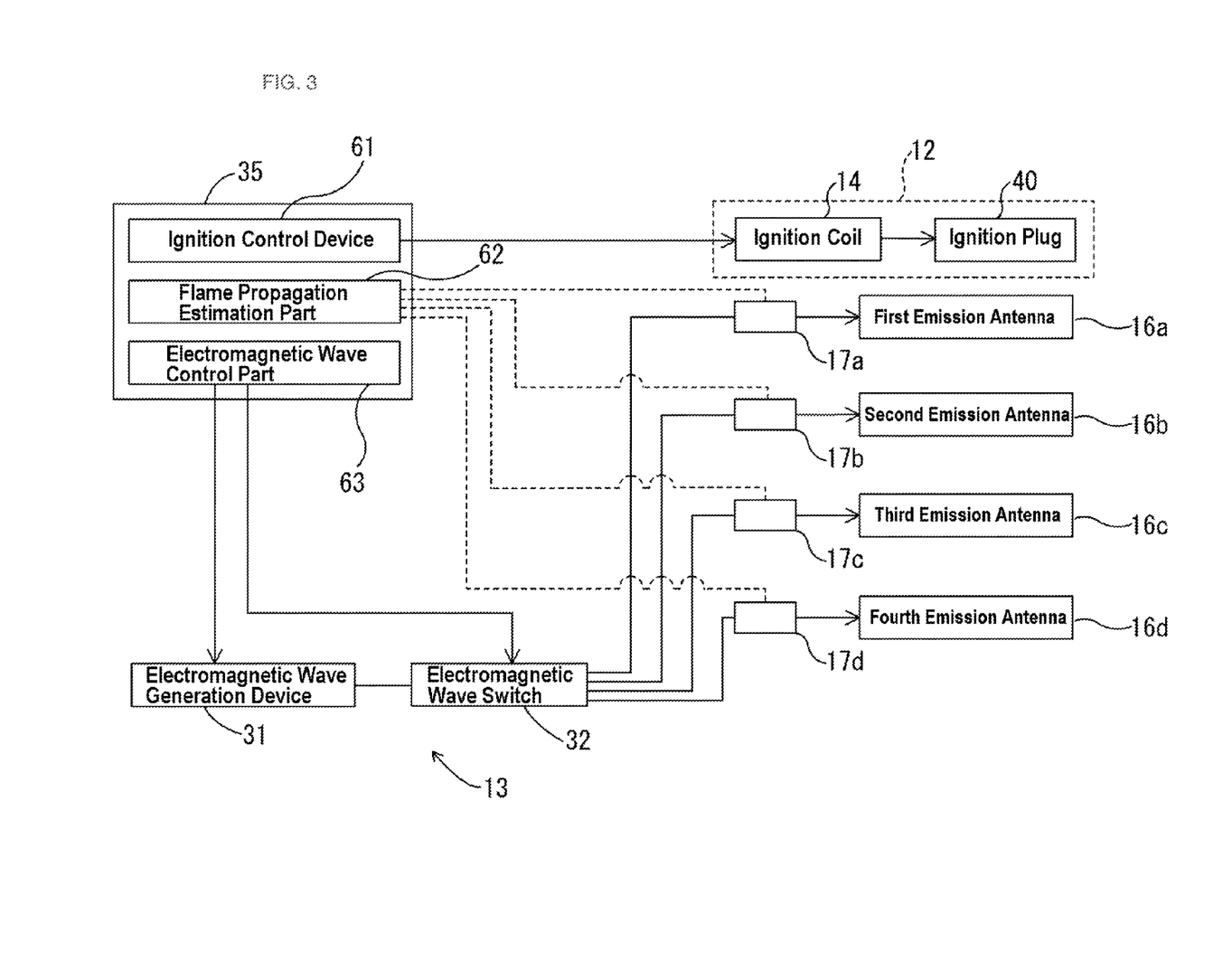
FIG. 3 is a block diagram of an ignition device and an electromagnetic wave emission device according to the embodiment.

The ignition device 12 is provided for each combustion chamber 20. As shown in FIG. 3, each ignition device 12 includes an ignition coil 14 that outputs a high voltage pulse, and an ignition plug 40 which the high voltage pulse outputted from the ignition coil 14 is supplied to.

The ignition coil 14 is connected to a direct current power supply (not shown). The ignition coil 14, upon receiving an ignition signal from the control device 35, boosts a voltage applied from the direct current power supply, and outputs the boosted high voltage pulse to the central electrode 40a of the ignition plug 40. The ignition plug 40, when the high voltage pulse is applied to the central electrode 40a, causes an insulation breakdown and a spark discharge to occur at the discharge gap. Along a discharge path of the spark discharge, discharge plasma is generated. The central electrode 40a is applied with a negative voltage as the high voltage pulse.

The ignition device 12 may include a plasma enlarging part that enlarges the discharge plasma by supplying the discharge plasma with electric energy. The plasma enlarging part enlarges the spark discharge, for example, by supplying the spark discharge with energy of a high frequency such as a microwave. By means of the plasma enlarging part, it is possible to improve stability of ignition even with a lean air fuel mixture. The electromagnetic wave emission device 13 may be utilized as the plasma enlarging part.

<Electromagnetic Wave Emission Device>

As shown in FIG. 3, the electromagnetic wave emission device 13 includes an electromagnetic wave generation device 31, an electromagnetic wave switch 32, and emission antennae 16. One electromagnetic wave generation device 31 and one electromagnetic wave switch 32 are provided for the electromagnetic wave emission device 13, and the emission antennae 16 are provided for each combustion chamber 20.

The electromagnetic wave generation device 31, upon receiving an electromagnetic wave drive signal from the control device 35, repeatedly outputs a microwave pulse at a predetermined duty cycle. The electromagnetic wave drive signal is a pulse signal. The electromagnetic wave generation device 31 repeatedly outputs the microwave pulse during a period of time of the pulse width of the electromagnetic wave drive signal. In the electromagnetic wave generation device 31, a semiconductor oscillator generates the microwave pulse. In place of the semiconductor oscillator, any other oscillator such as a magnetron may be employed.

The electromagnetic wave switch 32 includes an input terminal and a plurality of output terminals provided for the respective emission antennae 16. The input terminal is connected to the electromagnetic wave generation device 31. Each output terminal is connected to the corresponding emission antenna 16. The electromagnetic wave switch 32 switches a supply destination of the microwave outputted from the electromagnetic wave generation device 31 from among the plurality of the emission antennae 16 under a control of the control device 35.

A plurality of the emission antennae 16 are provided for each combustion chamber 20. In each combustion chamber 20, the plurality of the emission antennae 16 are provided on the ceiling surface 51 of the combustion chamber 20. The plurality of the emission antennae 16 are provided in respective directions different from one another in relation to an ignition location (a location of the discharge gap of the ignition plug 40) where the ignition device 12 ignites the air fuel mixture.

More particularly, four emission antennae 16 are provided in each combustion chamber 20. In each combustion chamber 20, the emission antennae 16 are respectively provided in outer parts of inter-opening regions 58 formed between adjacent openings from among intake side openings 25*a* and exhaust side openings 26*a*. In each combustion chamber 20, a first emission antenna 16*a* is provided in an inter-opening region 58*a* between the exhaust side openings 26*a*. A second emission antenna 16*b* and a third emission antenna 16*c* are respectively provided in inter-opening regions 58*b* and 58*c* between the intake side openings 25*a* and the exhaust side openings 26*a*. A fourth emission antenna 16*d* is provided in an inter-opening region 58*d* between the exhaust side openings 25*a*.

Figure 4:
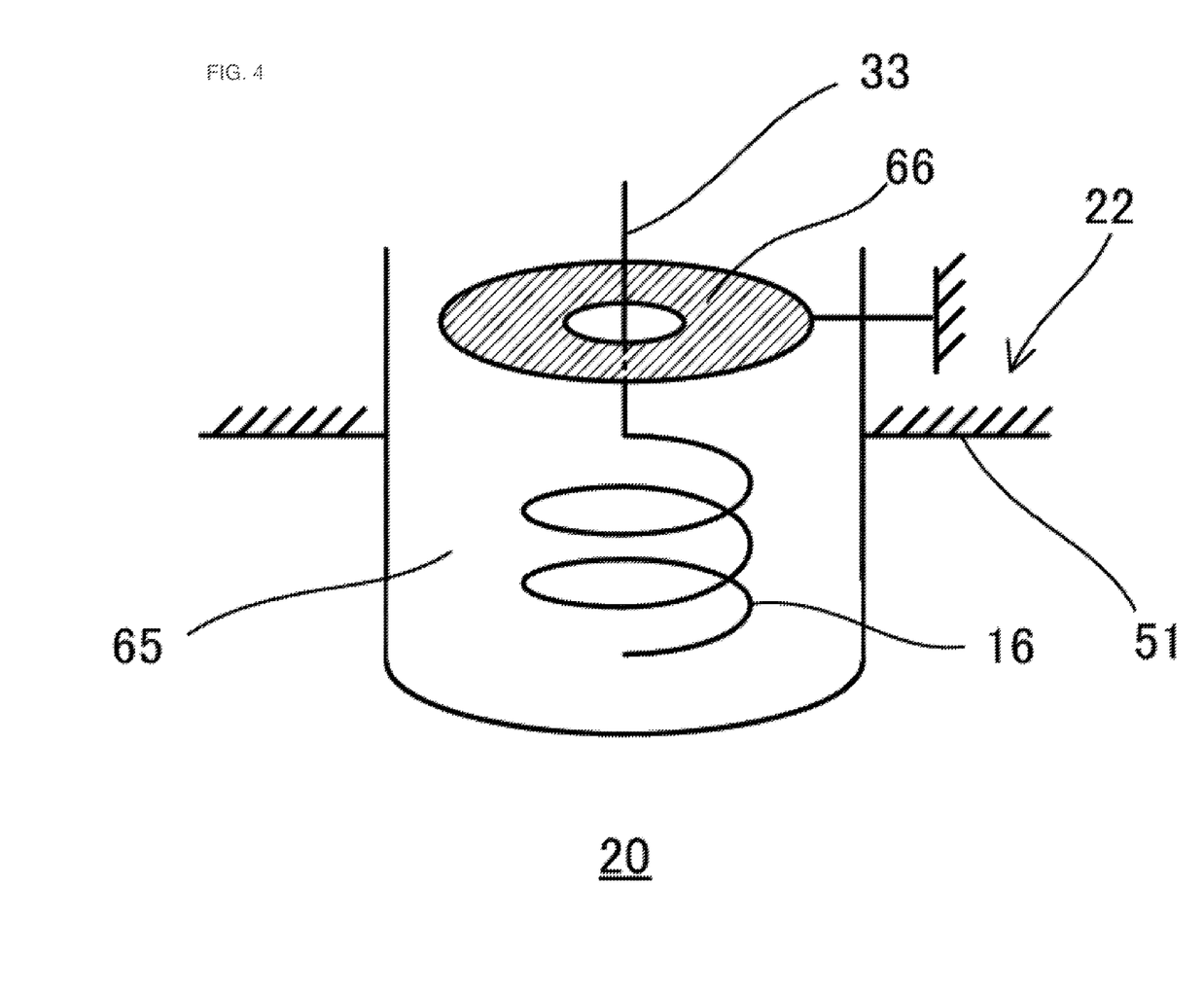
FIG. 4 is a schematic configuration diagram of an emission antenna according to the embodiment.

As shown in FIG. 1, each emission antenna 16 is protruded from the ceiling surface 51 of the combustion chamber 20. As shown in FIG. 4, each emission antenna 16 is formed in a helical shape and embedded in an insulator 65. A length of each emission antenna 16 is equal to a quarter wavelength of the microwave on the corresponding emission antenna 16. Each emission antenna 16 is electrically connected to the output terminal of the electromagnetic wave switch 32 via a transmission line 33 of the microwave embedded in the cylinder head 22.

According to the present embodiment, a ground electrode 66 is embedded in the insulator 65 in which the emission antenna 16 is provided. The ground electrode 66 is formed in a ring-like shape. Inside of the ground electrode 66, a transmission line 33 is inserted. The ground electrode 66 is arranged in the vicinity of the emission antenna 16. According to the present embodiment, the ground electrode 66 is provided for the purpose of increasing energy of the microwave emitted to the combustion chamber 20 from the emission antenna 16.

According to the above described configuration, the electromagnetic wave emission device 13 is capable of emitting the microwave to the combustion chamber 20 from the four emission antennae 16 for each combustion chamber 20. In the electromagnetic wave emission device 13, the microwave cannot be emitted simultaneously from the four emission antennae 16, but it is possible to emit the microwave from the four emission antennae 16 while the flame is propagating during one combustion cycle by switching the emission antenna 16 to be supplied with the microwave one after another at a high speed by means of the electromagnetic wave switch 32.

The electromagnetic wave emission device 13 may be provided with the same number of electromagnetic wave generation devices 31 as the emission antennae 16 provided for one combustion chamber 20. In this case, the electromagnetic wave generation devices 31 are connected to the respective emission antennae 16. In the electromagnetic wave emission device 13, it is possible to simultaneously emit the microwave to the combustion chamber 20 from the plurality of the emission antennae 16 by outputting the microwave from the plurality of electromagnetic wave generation devices 31 at the same time.

<Control Device>

The control device 35 performs an ignition operation, a first emission operation, an estimation operation, and a second emission operation during one combustion cycle for each combustion chamber 20. The ignition operation is an operation of instructing the ignition device 12 to ignite the air fuel mixture. The first emission operation and the second emission operation are operations of instructing the electromagnetic wave emission device 13 to emit the microwave. The estimation operation is an operation of estimating the propagation condition of the flame by means of the first emission operation.

As shown in FIG. 3, the control device 35 includes an ignition control part 61, a flame propagation estimation part 62, and an electromagnetic wave control part 63. In the control device 35, the ignition control part 61 performs the ignition operation, the flame propagation estimation part 62 performs the estimation operation, and the electromagnetic wave control part 63 performs the first emission operation and the second emission operation.

The flame propagation estimation part 62 constitutes a flame propagation estimation unit that performs the estimation operation of estimating the propagation condition of the flame while the flame is propagating in the combustion chamber 20. The electromagnetic wave control part 63 constitutes a control unit that controls the electromagnetic wave emission device 13 based on the estimation result of the estimation operation.

More particularly, the ignition operation is performed at an ignition timing at which the piston 23 locates immediately before the compression top dead center. The ignition control part 61 outputs, as the ignition operation, an ignition signal to the ignition device 12. The ignition device 12, upon receiving the ignition signal, causes a spark discharge to occur at the discharge gap of the ignition plug 40, as described above. The spark discharge ignites the air fuel mixture. When the air fuel mixture is ignited, the flame spreads from an ignition location of the air fuel mixture at a central part of the combustion chamber 20 toward the wall surface of the cylinder 24.

The first emission operation is performed after the air fuel mixture is ignited, for example, during a latter half of the flame propagation. The electromagnetic wave control part 63 outputs, as the first emission operation, an electromagnetic wave drive signal to the electromagnetic wave generation device 31. The electromagnetic wave generation device 31, upon receiving the electromagnetic wave drive signal, repeatedly outputs the microwave pulse during a period of time of the pulse width of the electromagnetic wave drive signal.

The first emission operation terminates at an end timing of the estimation operation, which will be described later. The pulse width of the electromagnetic wave drive signal varies in accordance with the end timing of the estimation operation, which will be described later.

In synchronization with the first emission operation, over a microwave output period in which the electromagnetic wave generation device 31 repeatedly outputs the microwave pulse, the electromagnetic wave control part 63 performs a switch operation of controlling the electromagnetic wave switch 32 so that the microwave is emitted sequentially from the four emission antennae 16 of the combustion chamber 20 during the flame propagation. The electromagnetic wave control part 63 performs the switch operation so that a cycle is repeated in which the supply destination of the microwave is switched one after another among the four emission antennae 16 in a round robin manner during the microwave output period.

The estimation operation is performed in conjunction with the first emission operation. Directional couplers 17 respectively provided for the emission antenna 16 are connected to the flame propagation estimation part 62. The directional couplers 17 are respectively provided in the transmission lines 33 that respectively connect the emission antennae 16 and the output terminals of the electromagnetic wave switch 32. A microwave (hereinafter, referred to as a "reflected wave") reflected from each emission antenna 16 is inputted in the flame propagation estimation part 62 via each directional coupler 17.

Figure 5:
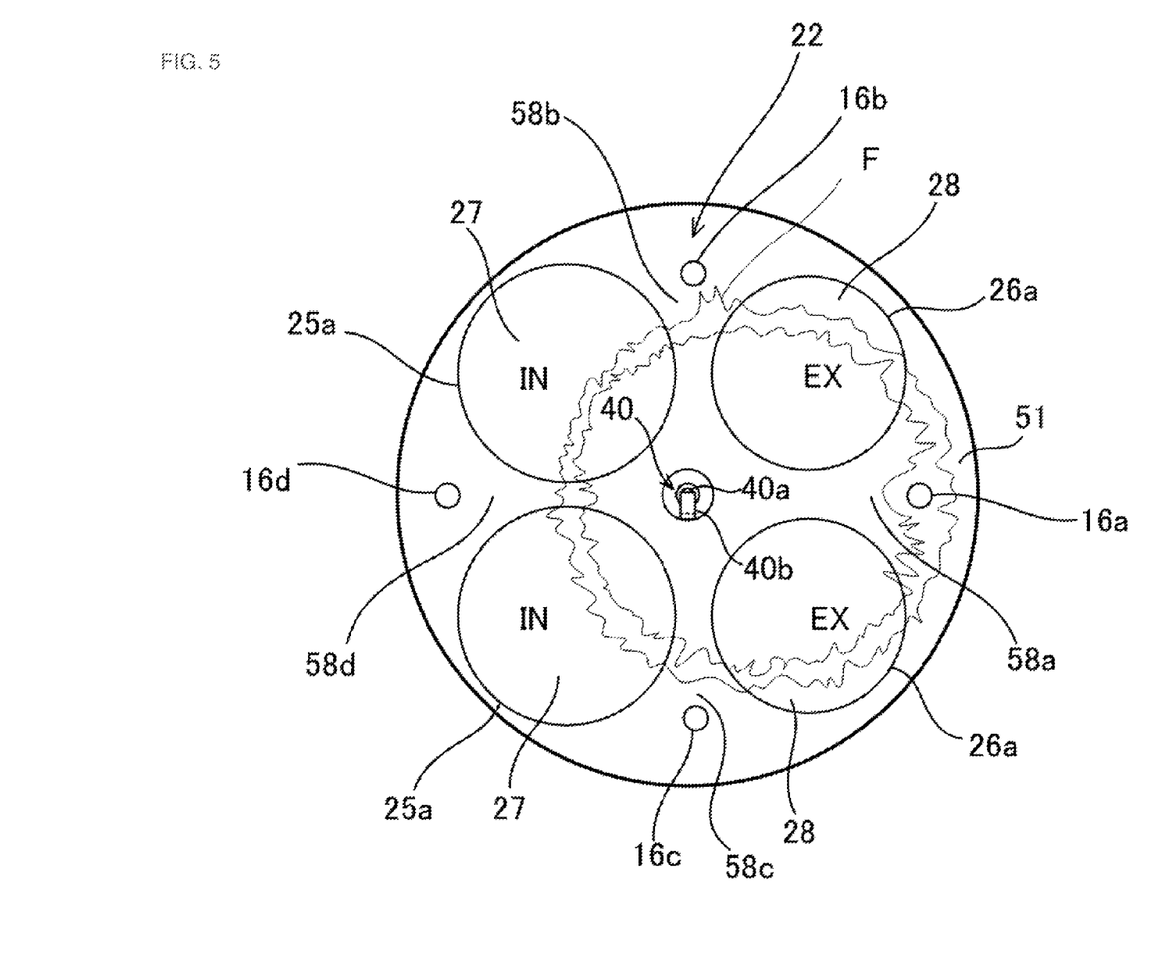
FIG. 5 is a diagram showing one example of a propagation condition of a flame in the combustion chamber according to the embodiment.

The flame propagation estimation part 62 detects the intensity of the reflected wave inputted from each directional coupler 17. Then, in a case in which the intensity of a reflected wave is detected as being equal to or less than a predetermined reference value, the flame propagation estimation part 62 determines that a flame F has passed through an arranged location of an emission antenna 16 that has reflected the reflected wave. For example, in a propagation condition of the flame F as shown in FIG. 5, the intensity of the reflected wave inputted from the directional coupler 17a corresponding to the first emission antenna 16a becomes equal to or less than the reference value while, on the other hand, the intensities of the reflected waves inputted from the directional couplers 17b, 17c, and 17d remain beyond the reference value.

In a case in which a decreased amount of intensity of a reflected wave exceeds a predetermined reference value, the flame propagation estimation part 62 may determine that the flame has passed through an arranged location of the emission antenna 16 which the reflected wave had been reflected from. Furthermore, the reference value maybe varied in accordance with an operation condition of the internal combustion engine main body 11. Furthermore, the flame propagation estimation part 62 may detect an emission antenna 16 arranged at an arranged location which the flame has passed through, in accordance with an intensity pattern of the reflected waves inputted from the four directional couplers 17.

The flame propagation estimation part 62 terminates the estimation operation when the intensities of the reflected waves from a predetermined number (for example, three) of the four emission antennae 16 do not exceed the reference value. Furthermore, the flame propagation estimation part 62 terminates the first emission operation of the electromagnetic wave control part 63 at the end timing of the estimation operation.

The second emission operation is performed immediately after the estimation operation. The estimation result of the estimation operation is inputted to the electromagnetic wave control part 63 from the flame propagation estimation part 62. As the estimation result of the estimation operation, such information is inputted to the electromagnetic wave control part 63 that is indicative of an emission antenna 16 (hereinafter, referred to as an "emission antenna 16 not yet reached by the flame") that has reflected a reflected wave the intensity of which exceeds the reference value at the end timing of the estimation operation.

As the second emission operation, the electromagnetic wave control part 63 performs two operations, i.e., an operation of outputting the electromagnetic wave drive signal and an operation of outputting a switch signal for switching the supply destination of the microwave to the emission antenna 16 not yet reached by the flame. As a result of this, the microwave pulse is repeatedly emitted only from the emission antenna 16 not yet reached by the flame from among the four emission antennae 16. In the vicinity of the emission antenna 16 not yet reached by the flame, a strong electric field region is formed that has an electric field relatively strong in intensity in the combustion chamber 20.

The flame passing through the arranged location of the emission antenna 16 not yet reached by the flame receives energy of the electric field from the strong electric field region and increases in propagation speed.

In a case in which the microwave energy is high, microwave plasma is generated in the strong electric field region. In a region where the microwave plasma is generated, active species such as OH radicals are generated. The flame passing through the strong electric field region increases in propagation speed owing to the active species.

In a case in which there are a plurality of the emission antennae not yet reached by the flame, the supply destination of the microwave is switched from among the plurality of the emission antennae not yet reached by the flame over a period of the second emission operation.

The electromagnetic wave control part 63 may determine a start timing of the second emission operation based on the estimation result of the estimation operation. This means that a timing of emitting the microwave from an emission antenna 16 is determined based on the estimation result of the estimation operation, wherein the emission antenna 16 is arranged at an arranged location which the flame has not yet passed through, and is different from the other emission antennae 16 arranged at arranged locations which the flame is estimated to have passed through. The electromagnetic wave control part 63 sets the start timing of the second emission operation with reference to the end timing of the estimation operation (a timing at which the flame has passed through the arranged locations of three emission antennae 16). The electromagnetic wave control part 63 sets the start timing of the second emission operation at the end timing of the estimation operation. The electromagnetic wave control part 63 may set the start timing of the second emission operation at a point of time when a predetermined time elapsed after the end timing of the estimation operation.

<Effect of Embodiment>

According to the present embodiment, the electromagnetic wave emission device 13 is controlled in view of the propagation condition of the flame estimated during the flame propagation. In the combustion chamber 20, the distance between the flame and the wall surface (an inner wall surface of the cylinder 24) of the combustion chamber 20 is different depending on the propagation direction of the flame viewed from the ignition location (the location of the discharge gap) of the air fuel mixture by the ignition device 12. In a case in which the strong tumble flow drifts the flame kernel from the discharge gap toward a side of the exhaust side openings 26a, the flame moves toward the vicinity of the wall surface of the combustion chamber 20 on the side of the exhaust side openings 26a. In this case, there is a concern that a larger amount of unburned gas is produced on a side of the intake side openings 25a. Thus, a region having high necessity to improve the propagation speed of the flame can be determined according to the propagation condition of the flame. According to the present embodiment, the electromagnetic wave emission device 13 is controlled in view of the region having high necessity to improve the propagation speed of the flame. Accordingly, it is possible to effectively improve the propagation speed of the flame utilizing the microwave.

Furthermore, according to the present embodiment, the estimation operation is performed during the flame propagation during one combustion cycle, and, based on the estimation result of the estimation operation, the electromagnetic wave emission device 13 emits the electromagnetic wave to the combustion chamber 20. According to the present embodiment, the estimation result of the estimation operation is utilized for improvement of the propagation speed of the flame in the combustion cycle in which the estimation operation has been performed.

Furthermore, according to the present embodiment, the propagation condition of the flame in the combustion chamber 20 is estimated based on the status of the reflected wave from each emission antenna 16. The propagation condition of the flame is estimated utilizing a part of the electromagnetic wave emission device 13 that has been adapted to improve the propagation speed of the flame. Accordingly, it is possible to prevent the configuration of the internal combustion engine 10 from being complicated for the sake of estimating the propagation condition of the flame in the combustion chamber 20.

Furthermore, according to the present embodiment, the microwave is emitted from an emission antenna 16 that is arranged in the region having high necessity to improve the propagation speed of the flame from among the plurality of the emission antennae 16. Accordingly, since it is possible to concentrate the microwave energy on the region having high necessity to improve the propagation speed of the flame, it is possible to effectively improve the propagation speed of the flame utilizing the microwave, and thus, to improve fuel efficiency of the internal combustion engine 10.

<Modified Example of Embodiment>

According to the modified example of the embodiment, the flame propagation estimation part 62 estimates a timing when the flame passes through the arranged location of every emission antenna 16. According to the difference among the timings when the flame passes through the arranged locations of the emission antennae 16, the propagation condition of the flame in the combustion chamber 20 is two-dimensionally estimated.

The electromagnetic wave control part 63 performs, as the second emission operation, an operation of controlling the electromagnetic wave emission device 13 so that a period of time for which the microwave is emitted from an emission antenna 16 is increased in a region where the flame propagation is relatively lagged from among the four emission antennae 16. In this case, the microwave is emitted even after the flame has passed through the arranged location of the emission antenna 16, and the flame propagation is promoted by the microwave emitted from the location behind the flame.

<Other Embodiments>

The embodiment described above may also be configured as follows.

In the embodiment described above, the flame propagation estimation part 62 may determine, based on a variation amount in phase of a reflected wave, whether or not the flame has passed through the arranged location of an emission antenna 16 that has reflected the reflected wave. When the variation amount in phase of the reflected wave is equal to or more than a predetermined reference value, the flame propagation estimation part 62 determines that the flame has passed through the arranged location of the emission antenna 16 that has reflected the reflected wave.

Furthermore, in the embodiment described above, during a stable period in which the operation condition (such as load, rotation speed, or a combination of the load and the rotation speed) of the internal combustion engine main body 11 does not change greatly, a result of the estimation operation performed at an early stage of the stable period may be continuously employed for the control of the electromagnetic wave emission device 13. For example, in a case in which it is known that the flame propagation is slow on the side of the exhaust side openings 26a according to the estimation operation that has been performed at the early stage of the stable period, the microwave is emitted only from the first emission antenna 16a between the exhaust side openings 26a at the time of the second emission operation over the stable period. Accordingly, it is possible to omit the first emission operation except for the early stage of the stable period.

Furthermore, in the embodiment described above, the flame propagation estimation part 62 may estimate the propagation condition of the flame in the combustion chamber 20 by means of an optical unit. Furthermore, the flame propagation estimation part 62 may estimate the propagation condition of the flame in the combustion chamber 20 based on an operation condition such as intake air mass at the intake ports 25 of the internal combustion engine main body 11.

Figure 6:
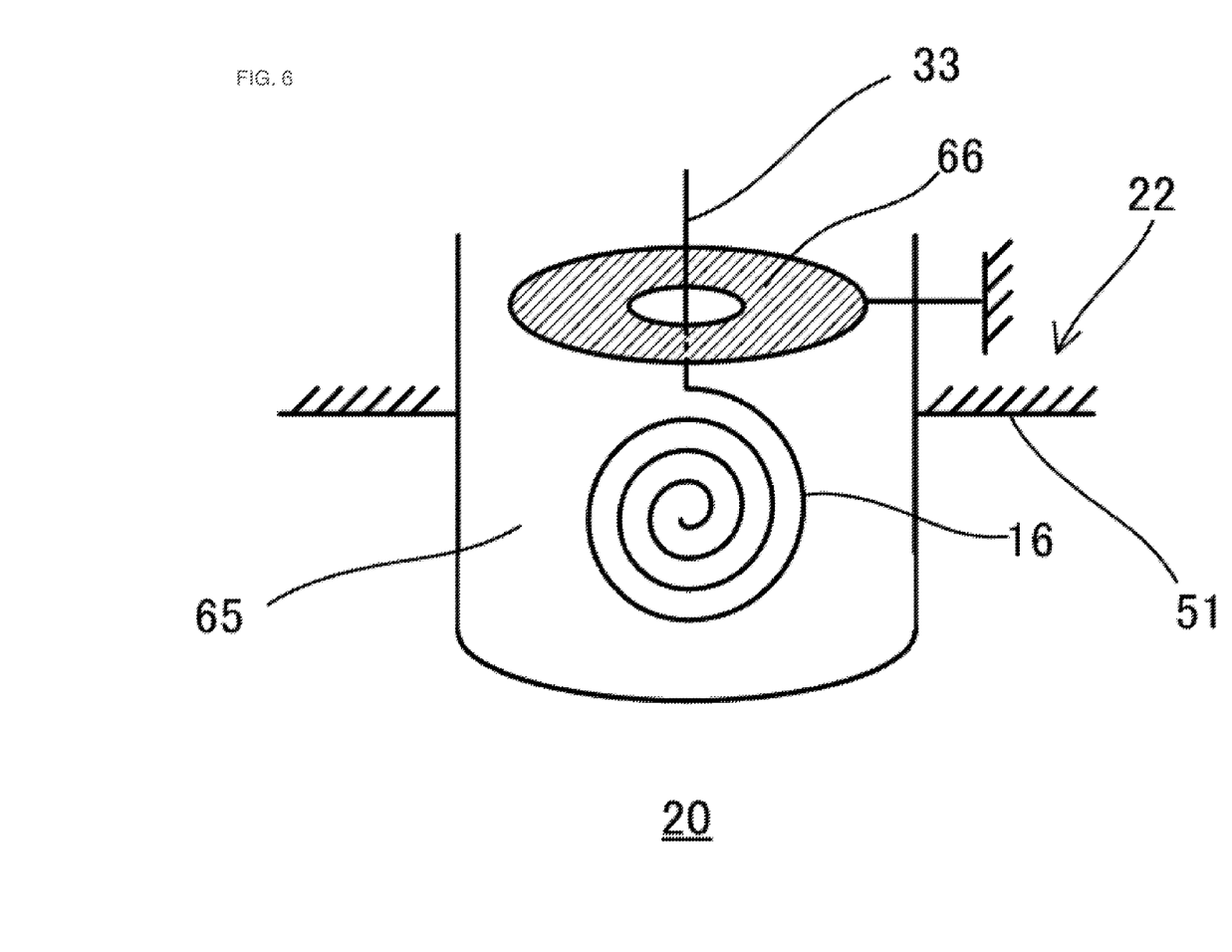
FIG. 6 is a schematic configuration diagram of an emission antenna according to another embodiment.

Furthermore, in the embodiment described above, although it has been described that the emission antenna 16 is formed in a helical shape centering on the transmission line 33, the emission antenna 16 may be formed in a helical shape along a vertical cross sectional plane of the insulator 65, as shown in FIG. 6. In this case, a central axis of the helix may coincide with a radial direction of the combustion chamber 20.

Figure 7:
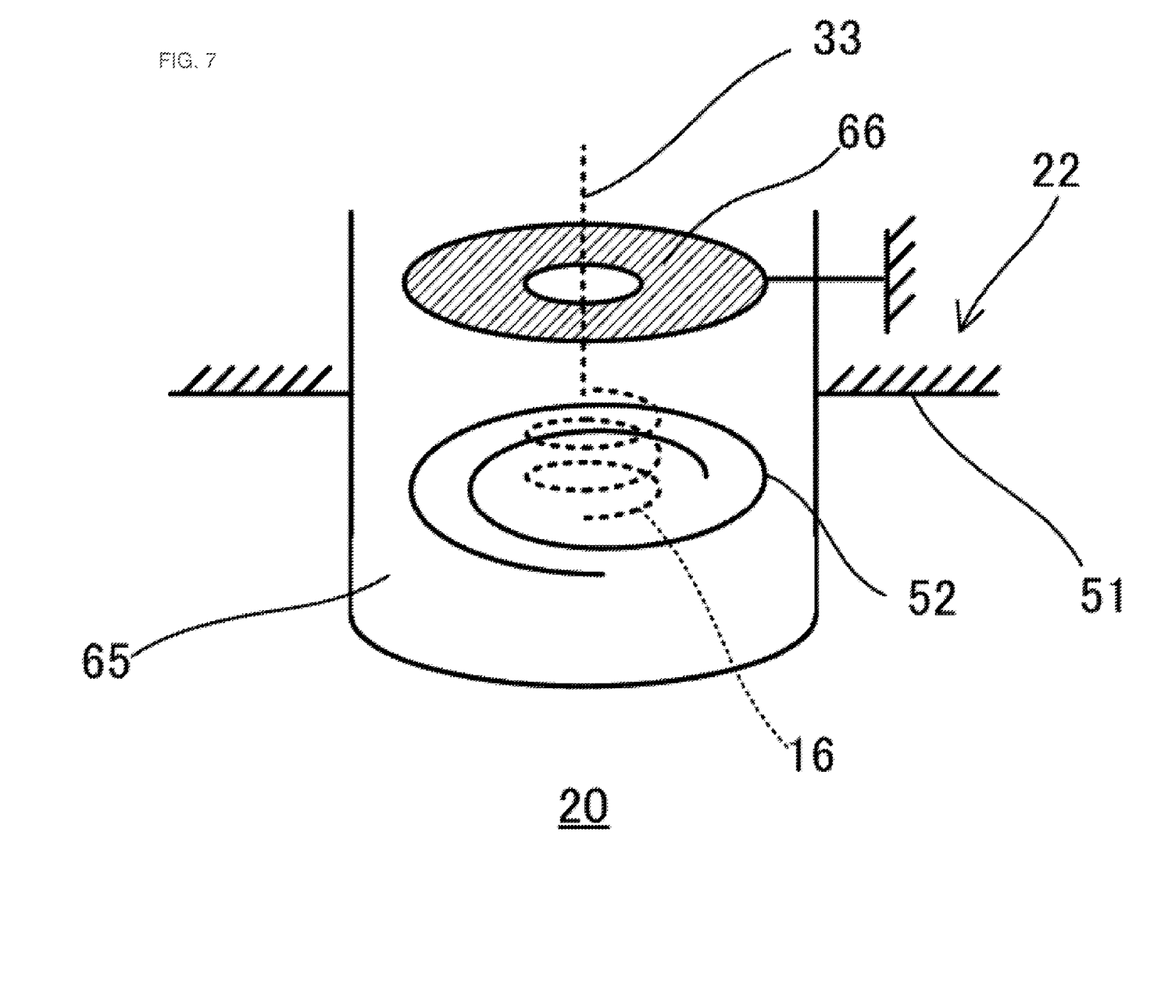
FIG. 7 is a schematic configuration diagram of a receiving antenna according to yet another embodiment.
Figure 8:
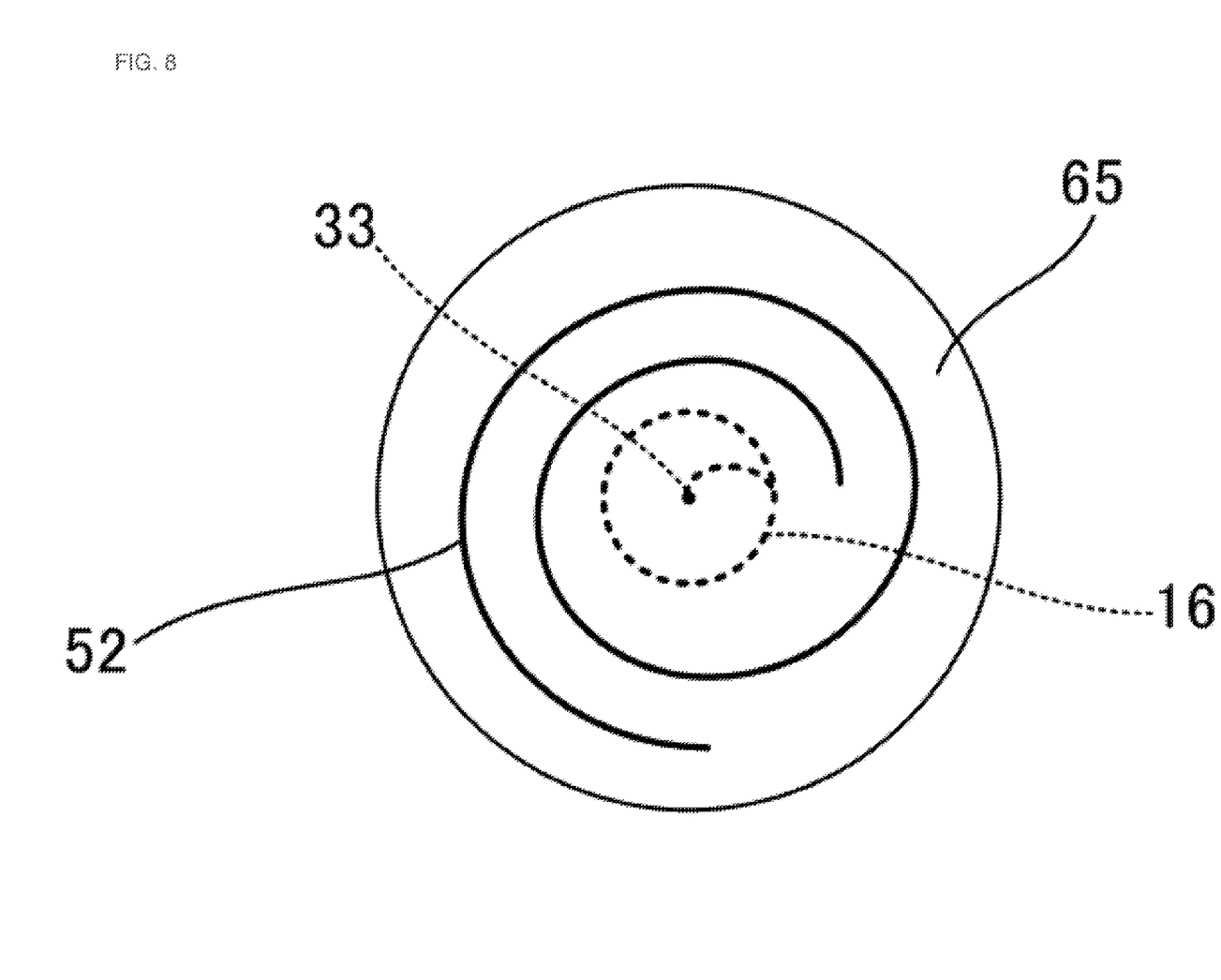
FIG. 8 is a horizontal cross sectional view of an insulator on which the receiving antenna according to the yet another embodiment is provided.

Furthermore, in the embodiment described above, as shown in FIGS. 7 and 8, a receiving antenna 52 in a helical shape may be provided outside of the helical shaped emission antenna 16 of FIG. 4. The receiving antenna 52 is an antenna that is not electrically connected to the emission antenna 16, and is adapted to resonate with the microwave emitted from the emission antenna 16. The receiving antenna 52 is embedded in the insulator 65 along with the emission antenna 16.

INDUSTRIAL APPLICABILITY

The present invention is useful in relation to an internal combustion engine that promotes combustion of an air fuel mixture in a combustion chamber utilizing an electromagnetic wave.

EXPLANATION OF REFERENCE NUMERALS

10 Internal Combustion Engine
11 Internal Combustion Engine Main Body
12 Ignition Device
13 Electromagnetic Wave Emission Device
16 Emission Antenna
20 Combustion Chamber
35 Control Device
62 Flame Propagation Estimation Part (Flame Propagation Estimation Unit)
63 Electromagnetic Wave Control Part (Control Unit)

What is claimed is:

1. An internal combustion engine comprising an internal combustion engine main body formed with a combustion chamber; and an ignition device that ignites an air fuel mixture in the combustion chamber, wherein combustion cycles, in which the ignition device ignites and combusts the air fuel mixture, are repeated, the internal combustion engine further comprises:

an electromagnetic wave emission device that includes a plurality of emission antennae for each combustion chamber and that emits an electromagnetic wave to the combustion chamber from the plurality of emission antennae, the plurality of emission antennae being arranged in the combustion chamber in respective directions different from one another in relation to an ignition location where the ignition device ignites the air fuel mixture;

a flame propagation estimation unit that performs an estimation operation of estimating a propagation condition of a flame during a flame propagation in the combustion chamber; and a control unit that controls the electromagnetic wave emission device based on an estimation result of the estimation operation to emit the electromagnetic wave to the combustion chamber from the plurality of emission antennae at the time of the estimation operation, wherein the flame propagation estimation unit performs an operation, as the estimation operation, of estimating the propagation condition of the flame in the combustion chamber based on a status of the electromagnetic wave reflected from each of the plurality of the emission antennae.

2. The internal combustion engine according to claim 1, wherein while the flame is propagating during one combustion cycle, the control unit controls the electromagnetic wave emission device to emit the electromagnetic wave to the combustion chamber based on the estimation result of the estimation operation that has been performed in the same combustion cycle.

3. An internal combustion engine comprising an internal combustion engine main body formed with a combustion chamber; and an ignition device that ignites an air fuel mixture in the combustion chamber, wherein combustion cycles, in which the ignition device ignites and combusts the air fuel mixture, are repeated, the internal combustion engine further comprises:

an electromagnetic wave emission device that emits an electromagnetic wave to the combustion chamber from an emission antenna;

a flame propagation estimation unit that performs an estimation operation of estimating a propagation condition of a flame during a flame propagation in the combustion chamber; and a control unit that controls the electromagnetic wave emission device based on an estimation result of the estimation operation, wherein while the flame is propagating during one combustion cycle, the control unit controls the electromagnetic wave emission device to emit the electromagnetic wave to the combustion chamber based on the estimation result of the estimation operation that has been performed in the same combustion cycle, the electromagnetic wave emission device includes a plurality of the emission antennae for each combustion chamber, the plurality of the emission antennae are arranged in the combustion chamber in respective directions different from one another in relation to an ignition location where the ignition device ignites the air fuel mixture, and the control unit controls, based on the estimation result of the estimation operation, the electromagnetic wave emission device to emit the electromagnetic wave from an emission antenna that is arranged in a region which the flame passes through at a relatively lagged timing in the combustion chamber.

4. An internal combustion engine comprising an internal combustion engine main body formed with a combustion chamber; and an ignition device that ignites an air fuel mixture in the combustion chamber, wherein combustion cycles, in which the ignition device ignites and combusts the air fuel mixture, are repeated, the internal combustion engine further comprises:

an electromagnetic wave emission device that emits an electromagnetic wave to the combustion chamber from an emission antenna;

a flame propagation estimation unit that performs an estimation operation of estimating a propagation condition of a flame during a flame propagation in the combustion chamber; and a control unit that controls the electromagnetic wave emission device based on an estimation result of the estimation operation, wherein while the flame is propagating during one combustion cycle, the control unit controls the electromagnetic wave emission device to emit the electromagnetic wave to the combustion chamber based on the estimation result of the estimation operation that has been performed in the same combustion cycle, the electromagnetic wave emission device includes a plurality of the emission antennae for each combustion chamber, the plurality of the emission antennae are arranged in the combustion chamber in respective directions different from one another in relation to an ignition location where the ignition device ignites the air fuel mixture, the flame propagation estimation unit performs an operation, as the estimation operation, of estimating a timing at which the flame passes through the arranged location of each emission antenna based on the status of the electromagnetic wave reflected by the emission antenna, and the control unit determines, based on the estimation result of the estimation operation, a timing of emitting the microwave from an emission antenna is determined, wherein the emission antenna is arranged at an arranged location which the flame has not yet passed through, and is different from other emission antennae arranged at arranged locations which the flame is estimated to have passed through.

5. The internal combustion engine according to claim 2, wherein the control unit controls the electromagnetic wave emission device to emit the electromagnetic wave to the combustion chamber from the emission antenna at the time of the estimation operation, and the flame propagation estimation unit performs an operation, as the estimation operation, of estimating the propagation condition of the flame in the combustion chamber based on a status of the electromagnetic wave reflected from the emission antenna.

* * * * *